May 7, 1929.  J. J. CURLEY  1,712,295
ROTATABLE CONNECTER FOR VEHICLE DIRECTION INDICATION
Filed Aug. 1, 1925
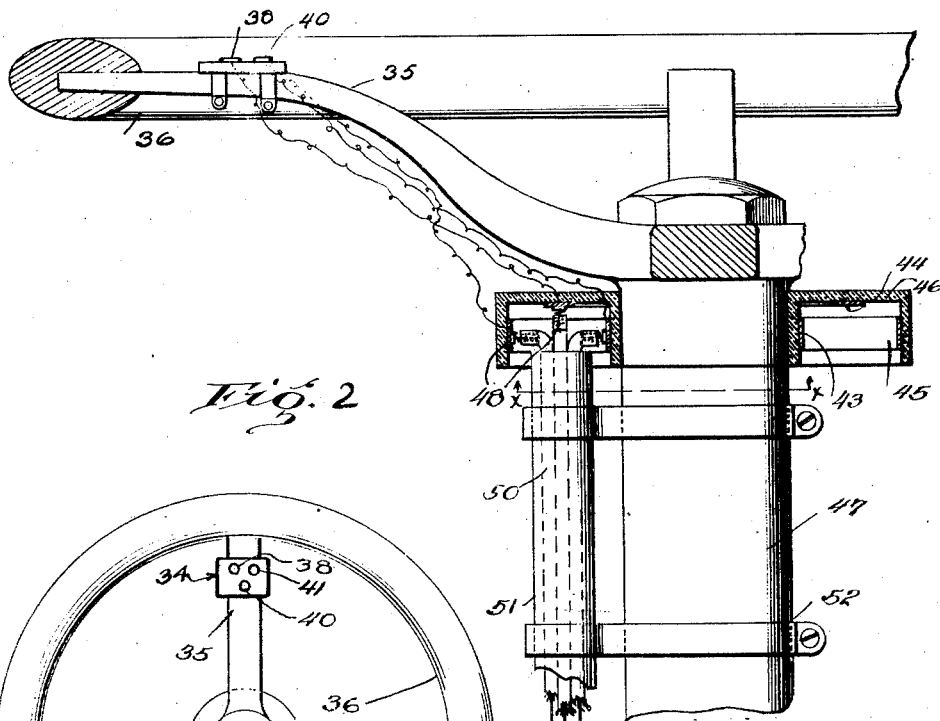
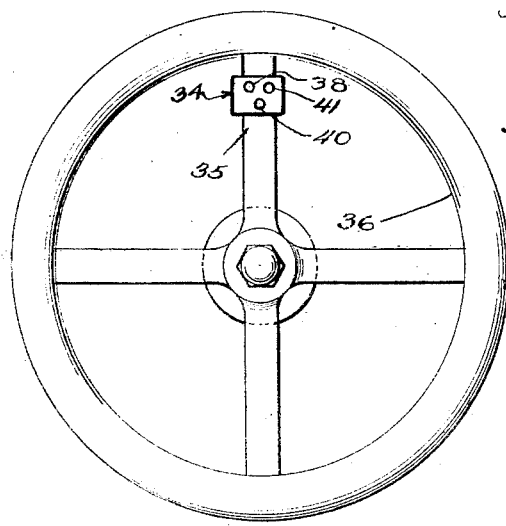
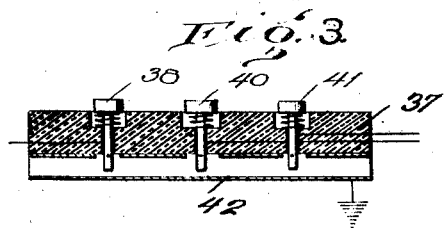
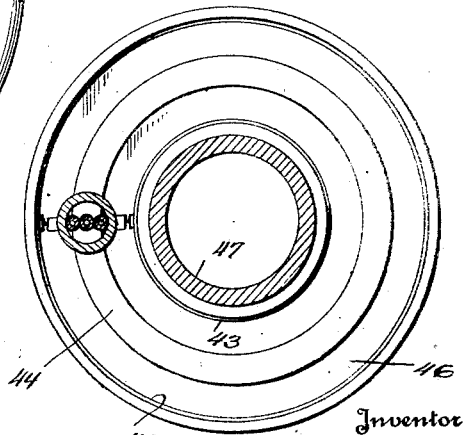
Inventor
J. J. Curley
By
Attorney Patented May 7, 1929.

1,712,295

UNITED STATES PATENT OFFICE.

JOHN J. CURLEY, OF BROCKTON, MASSACHUSETTS.

ROTATABLE CONNECTER FOR VEHICLE DIRECTION INDICATION.

Application filed August 1, 1925. Serial No. 47,526.

This invention relates to a circuit control means having special application in systems of direction indication for motor vehicles.

One of the objects of my invention is to provide an operating switch under the control of the driver for use in a system of indicating by signal the direction or intended direction of a moving motor vehicle, whereby one in the rear or in advance of the vehicle is informed of the contemplated direction of travel of the vehicle.

A further object is to provide a switch for use with a system of direction indication for motor vehicles which is operable at the will of the driver of the vehicle to give an indication of change of, or continuance in direction, in traffic or otherwise, prior to such change of direction.

A further object is to provide a switch for use with a system of direction indication for motor vehicles which is operable from the natural driving position occupied by the driver without the necessity of his releasing the wheel or chance of losing control thereof.

A further object is to provide a device of the above described character which is efficient in operation, simple and durable in construction, and which is adapted to fulfill among others the objects as above set forth.

The invention accordingly consists in the features of construction, the combination of parts, and in the unique relation of the various members and the relative proportioning and dispositioning thereof, all as more clearly outlined herein.

To enable others skilled in the art to fully comprehend the underlying features thereof, in order that they may embody the same, by numerous modifications in structure and relation contemplated by this invention, drawings depicting a preferred form of the invention have been annexed as part of this disclosure, and in such drawings like characters of reference indicate corresponding parts throughout all the views, of which—

Figure 1 is an elevation of the steering post of a vehicle and proposed arrangement of the contacting device therewith, certain parts being shown in section.

Figure 2 is a top view of a steering wheel showing the position of a button switch and contacting device.

Figure 3 is a section of the button switch.

Figure 4 is a section along lines x—x of Figure 1.

Referring now to the drawing there is provided a button switch 34 fastened to the radial spoke 35 of the steering wheel 36 of the vehicle. As shown in Figure 3, the switch comprises a body member 37 having mounted in recesses therein spring-pressed plungers or buttons 38, 40 and 41. These plungers, when pressed downwardly, make contact with a plate 42 of conducting material, which in turn is connected with the metal spoke of the steering wheel 36, forming therewith a return connection. The plate 42 is suitably connected as by wires to contact rings 43, 44 and 45 (see Figure 1) and in circuit with, for example, a suitable indicator (not shown) for indicating a contemplated left hand turn upon completion of the circuit by pressing the button or plunger 38; with another indicator (not shown) for indicating a contemplated right hand turn by button 41; and with a third indicator (not shown) for indicating straight ahead travel, all of which is well known.

The contacts 43, 44 and 45 are in the form of annular metal rings mounted within the annular channel member 46 of bakelite or other insulating composition positioned about and fixed to the hub of the steering wheel 36, the post thereof extending thru the tubular steering column 47. Contacting with the metal rings 43, 44 and 45 are spring contacts 48 which engage the rings at all positions of the steering wheel. The spring contacts 48 are electrically connected, and mounted on contacting rods 50 which are insulated from each other and which extend thru a fixed fiber tube 51 attached to the steering column 47, as for example, by bearing clamps 52 and are connected with lead wires to the various indicators.

It is thus apparent that there is provided in the above described invention a simple and efficient switch so positioned as to be at all times under the control of the driver and particularly adapted for use in a system of indicating by signal the direction or intended direction of a moving motor vehicle. Such a device is advantageous in preventing accidents, as it facilitates the operation of a vehicle in turning or while in traffic and indicates at the will of the operator whether he intends to make a left or a right turn, or to continue in the direction in which he is travelling.

In view of the above, it will be seen that the several objects of the invention are achieved and other advantageous results attained. As many changes could be made in carrying out the above construction, without departing from the scope of the invention, it is intended that all matter contained in the above description or shown in the accompanying drawings shall be interpreted as illustrative and not in a limiting sense.

I claim:

1. In an apparatus of the class described, the combination of the steering wheel and column; an annular channel member of insulating material rotatable with said steering wheel, annular conducting rings contained within said member and mounted on the inner surface of the leg and cross portion of said annular member, relatively fixed spring contacts engaging each of said rings in all positions of the steering wheel and forming electrical connections therebetween, and conducting rods on which said contacts are mounted extending in a single tube along said steering column.

2. In an apparatus of the class described, the combination of the steering wheel and column, an annular channel member of insulating material rotatable with said steering wheel, annular conducting rings mounted on the inner surface of the legs and cross portion of said channel member, relatively fixed spring contacts mounted in the channel portion of said channel member, each of said contacts engaging one of the rings in all positions on the steering wheel, and conducting rods on which said contacts are mounted along said steering column, each of said rings, contacts and rods forming a connecter unit in individual electrical circuits.

Signed at Brockton, Massachusetts, June, 1925.

JOHN J. CURLEY.